US012799024B2

(12) United States Patent
Minagawa

(10) Patent No.: US 12,799,024 B2
(45) Date of Patent: Nov. 17, 2026

(54) POLYMER-COATED GLASS SUBSTRATE

(71) Applicant: SUMITOMO RUBBER INDUSTRIES, LTD., Kobe (JP)

(72) Inventor: Yasuhisa Minagawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 152 days.

(21) Appl. No.: 18/519,599

(22) Filed: Nov. 27, 2023

(65) Prior Publication Data

US 2024/0217869 A1 Jul. 4, 2024

(30) Foreign Application Priority Data

Dec. 23, 2022 (JP) ................................ 2022-206606
Oct. 24, 2023 (JP) ................................ 2023-182573

(51) Int. Cl.

| | |
|---|---|
| ***C03C 17/32*** | (2006.01) |
| ***C08F 20/28*** | (2006.01) |
| ***C09D 133/14*** | (2006.01) |

(52) U.S. Cl.

CPC .............. *C03C 17/32* (2013.01); *C08F 20/28* (2013.01); *C09D 133/14* (2013.01); *C03C 2217/75* (2013.01)

(58) Field of Classification Search

None

See application file for complete search history.

(56) References Cited

U.S. PATENT DOCUMENTS

| | | | |
|---|---|---|---|
| 4,304,802 | A | 12/1981 | Mosse et al. |
| 2011/0200792 | A1 | 8/2011 | Husher et al. |
| 2012/0015440 | A1 | 1/2012 | Otsuka et al. |
| 2018/0230045 | A1 | 8/2018 | Ohkawa |
| 2019/0233555 | A1* | 8/2019 | Minagawa ............ C08F 120/28 |
| 2019/0250149 | A1 | 8/2019 | Minagawa et al. |
| 2019/0250150 | A1 | 8/2019 | Minagawa et al. |
| 2019/0250151 | A1 | 8/2019 | Minagawa et al. |
| 2020/0164112 | A1 | 5/2020 | Kato et al. |
| 2020/0238201 | A1 | 7/2020 | Minagawa et al. |
| 2020/0346972 | A1 | 11/2020 | Eguchi et al. |
| 2021/0101829 | A1 | 4/2021 | Minagawa et al. |
| 2021/0372895 | A1 | 12/2021 | Minagawa |

FOREIGN PATENT DOCUMENTS

| | | | |
|---|---|---|---|
| EP | 2 258 780 | A1 | 12/2010 |
| EP | 3 670 463 | A1 | 6/2020 |
| EP | 3 915 957 | A1 | 12/2021 |
| EP | 3 915 957 | B1 | 5/2023 |
| JP | 2005-523981 | A | 8/2005 |
| JP | 2010-65082 | A | 3/2010 |
| JP | 2019-131713 | A | 8/2019 |
| JP | 2019-138838 | A | 8/2019 |
| JP | 2019-138839 | A | 8/2019 |
| JP | 2019-138841 | A | 8/2019 |
| JP | 2020-100062 | A | 7/2020 |
| JP | 2020-115787 | A | 8/2020 |
| JP | 2020-118661 | A | 8/2020 |
| JP | 2021-55035 | A | 4/2021 |
| JP | 2024-91254 | A | 7/2024 |
| WO | WO 03/093357 | A1 | 11/2003 |
| WO | WO 2014/058080 | A1 | 4/2014 |
| WO | WO 2017/065286 | A1 | 4/2017 |
| WO | WO 2018/207586 | A1 | 11/2018 |
| WO | WO 2019/151265 | A1 | 8/2019 |

OTHER PUBLICATIONS

"Silane Coupling Agents, Combination of Organic and Inorganic Materials," Shin-Etsu Silicone, 2017, 28 pages total.

* cited by examiner

*Primary Examiner* — Sheeba Ahmed
(74) *Attorney, Agent, or Firm* — Birch, Stewart, Kolasch & Birch, LLP

(57) ABSTRACT

Provided is a polymer-coated glass substrate that can reduce the capture of normal cells such as blood cells and selectively capture specific cells such as cancer cells. The present disclosure relates to a polymer-coated glass substrate which includes a glass substrate and a polymer layer formed on a surface of the glass substrate, a surface of the polymer layer having an elastic modulus in water or an aqueous solution of 1.20 MPa or lower.

7 Claims, No Drawings

POLYMER-COATED GLASS SUBSTRATE

TECHNICAL FIELD

The present disclosure relates to a polymer-coated glass substrate.

BACKGROUND ART

A technique of coating the surface of a substrate with a special polymer has been proposed to prepare a device for capturing specific cells (e.g., blood cells, cancer cells present in blood or biological fluid) from blood or biological fluid.

However, the surface of the substrate may capture blood cells together with specific cells such as cancer cells. Thus, it is desirable to provide a polymer-coated substrate that can more selectively capture specific cells such as cancer cells while reducing the capture of normal cells such as blood cells.

SUMMARY OF DISCLOSURE

Technical Problem

The present disclosure aims to solve the above problem and provide a polymer-coated glass substrate that can reduce the capture of normal cells such as blood cells and selectively capture specific cells such as cancer cells.

Solution to Problem

The present disclosure relates to a polymer-coated glass substrate, including a glass substrate and a polymer layer formed on a surface of the glass substrate, a surface of the polymer layer having an elastic modulus in water or an aqueous solution of 1.20 MPa or lower.

Advantageous Effects of Disclosure

The present disclosure provides a polymer-coated glass substrate including a glass substrate and a polymer layer formed on a surface of the glass substrate, wherein a surface of the polymer layer has an elastic modulus in water or an aqueous solution of 1.20 MPa or lower. Such a polymer-coated glass substrate can reduce the capture of normal cells such as blood cells and selectively capture specific cells such as cancer cells. Thus, the polymer-coated glass substrate is expected to improve the ability to capture specific cells such as cancer cells.

DESCRIPTION OF EMBODIMENTS

The polymer-coated glass substrate of the present disclosure includes a glass substrate and a polymer layer formed on a surface of the glass substrate, and a surface the polymer layer has an elastic modulus in water or an aqueous solution of 1.20 MPa or lower.

The number of tumor cells (cancer cells, etc.) appearing in biological fluid, such as circulating tumor cells (several to hundreds of cells/1 ml of blood), is very small, and it is considered important to capture as many tumor cells as possible from the sampled biological fluid for analysis. The surface of the polymer layer of the polymer-coated glass substrate of the present disclosure has an elastic modulus in water or an aqueous solution of 1.20 MPa or lower. Specific cells such as cancer cells are known to be generally softer than normal cells such as blood cells. This is related to the fact that when specific cells such as cancer cells metastasize, they deform their cell shape greatly and move through gaps. Thus, normal cells such as blood cells, which are less deformable and harder, are less likely to be captured by a polymer substrate having a soft surface. In contrast, specific cells such as cancer cells that have acquired deformability are easily captured even by a polymer substrate having a soft surface. Therefore, it is expected that by counting the number of tumor cells captured on the polymer layer of the polymer-coated glass substrate of the present disclosure, one can determine the number of tumor cells in the biological fluid, e.g., to evaluate the cancer-treating effect. Moreover, the captured tumor cells may be cultured and then used to determine the effects of drugs such as anticancer drugs ex vivo before administration of the drugs such as anticancer drugs, and also helps to screen drugs such as anticancer drugs. Furthermore, genetic analysis of the captured tumor cells helps to screen drugs such as anticancer drugs.

The specified polymer-coated glass substrate includes a glass substrate and a polymer layer formed on a surface of the glass substrate, and a surface of the polymer layer has an elastic modulus in water or an aqueous solution of 1.20 MPa or lower.

To be able to reduce the capture of normal cells such as blood cells and selectively capture specific cells such as cancer cells, the elastic modulus is preferably 0.80 MPa or lower, more preferably 0.50 MPa or lower, still more preferably 0.30 MPa or lower. The lower limit is not limited, but it is preferably 0.01 MPa or higher, more preferably 0.05 MPa or higher, still more preferably 0.07 MPa or higher.

The elastic modulus in water or an aqueous solution can be controlled by changing the molecular weight of the polymer forming the polymer layer or the film thickness. Specifically, the elastic modulus tends to increase as the molecular weight of the polymer increases or as the film thickness of the polymer layer increases.

The elastic modulus in water or an aqueous solution can also be controlled by previously subjecting the glass substrate to surface treatment, such as treatment with a primer or a silane coupling agent. Specifically, the elastic modulus tends to increase when the polymer layer is formed on a surface of the glass substrate that has been subjected to surface treatment.

Herein, the term "elastic modulus in water or an aqueous solution" refers to the elastic modulus in water or an aqueous solution measured with an atomic force microscope (AFM), unless otherwise stated.

An atomic force microscope (AFM) is a type of scanning probe microscope which detects the force acting between the atoms on the sample and the atoms on the probe. The probe is attached to the tip of the cantilever (cantilever spring). The force (amount of deflection) acting on the cantilever can be measured while changing the distance between the sample and the probe to obtain a curve (force curve) plotting the relationships between them. Analysis of the force curve can determine the elastic modulus (hardness) of the surface of the sample at the nano scale. The method for determining the elastic modulus of the surface of the sample by the force curve analysis is known to those skilled in the art. The elastic modulus can be determined by such a known method.

For example, the elastic modulus may be calculated from the force curve by fitting the force curve according to the Johnson-Kendall-Roberts (JKR) theory to calculate the elastic modulus. According to the JKR theory, the force F applied to the cantilever and the amount of deformation $\delta$ of the sample are expressed by the following equations (1) and (2) with w representing the adhesion energy.

$$F = \frac{a^3}{R} - \sqrt{6\pi K w a^3} \quad (1)$$

$$\delta = \frac{a^2}{3R} + \frac{2F}{3aK} \quad (2)$$

In the equations, a denotes the radius of a contact line between the probe and the sample, R denotes the radius of curvature of the probe tip, and K denotes the elastic coefficient.

The elastic modulus can be determined from the F-δ curve obtained by the force curve analysis and the fitting using equations (1) and (2).

Here, the elastic modulus in water or an aqueous solution specifically refers to the value measured as follows.

The elastic modulus in water or an aqueous solution can be measured with an AFM by dropping water or an aqueous solution on the surface of the sample to form a droplet (convex meniscus).

Suitable examples of the aqueous solution include phosphate buffered saline (PBS).

Then, the elastic modulus of the sample (the surface of the polymer layer) may be determined, for example, by scanning the surface of the sample within a predetermined range to acquire force curves obtained at multiple points within the predetermined range, determining the elastic moduli from the force curves, and calculating the average thereof.

The type of glass of the glass substrate is not limited. Examples include soda lime glass, alkali-free glass, borosilicate glass ($SiO_2$—$B_2O_3$—ZnO glass, $SiO_2$—$B_2O_3$—$Bi_2O_3$ glass, etc.), potash glass, crystal glass (glass containing PbO, such as $SiO_2$—PbO glass, $SiO_2$—PbO—$B_2O_3$ glass, $SiO_2$—$B_2O_3$—PbO glass, etc.), titanium crystal glass, barium glass, boron glass ($B_2O_3$—ZnO—PbO glass, $B_2O_3$—ZnO—$Bi_2O_3$ glass, $B_2O_3$—$Bi_2O_3$ glass, $B_2O_3$—ZnO glass, etc.), strontium glass, alumina silicate glass, soda zinc glass, and soda barium glass (BaO—$SiO_2$ glass, etc.). These types of glass may be used alone or in admixtures of two or more.

Although the thickness of the glass substrate is not limited, the average thickness is preferably at least 100 μm but not more than 5000 μm, more preferably at least 500 μm but not more than 3000 μm. Here, the term "average thickness" refers to the value obtained by measuring the thickness at ten arbitrary points using a micrometer and averaging the measurements.

The polymer of the polymer layer may be an appropriate known polymer.

Examples of the polymer include homopolymers of single monomers and copolymers of two or more monomers. The polymers may be used alone or in combinations of two or more. Polymers having hydrophilicity (hydrophilic polymers) are desirable among the polymers.

The polymer used can be produced by known methods. For example, it may be synthesized by polymerizing a monomer of the polymer by a known method using a solution of the monomer. Non-limiting examples of the solvent of the monomer solution include those described later. Toluene or methanol is preferred among these.

Examples of the hydrophilic polymers include homopolymers or copolymers of one or two or more hydrophilic monomers, and copolymers of one or two or more hydrophilic monomers and one or two or more additional monomers. These may be used alone or in combinations of two or more.

Non-limiting examples of the hydrophilic monomers include various monomers containing hydrophilic groups. Examples of the hydrophilic groups include known hydrophilic groups such as an amide group, a sulfuric acid group, a sulfonic acid group, a carboxylic acid group, a hydroxy group, an amino group, and an oxyethylene group. Specific examples of the hydrophilic monomers include (meth)acrylic acids, (meth)acrylic acid esters (e.g., alkoxyalkyl (meth)acrylates such as methoxyethyl (meth)acrylates, and hydroxyalkyl (meth)acrylates such as hydroxyethyl (meth)acrylates), (meth)acrylamides, and (meth)acrylamide derivatives containing cyclic groups (e.g., (meth)acryloylmorpholines). Preferred among these are (meth)acrylic acids, (meth)acrylic acid esters, and alkoxyalkyl (meth)acrylates, with alkoxyalkyl (meth)acrylates being more preferred, with 2-methoxyethyl acrylate being particularly preferred. These may be used alone or in combinations of two or more.

The additional monomers may be appropriately selected as long as they do not inhibit the advantageous effect of the hydrophilic polymers. Specific examples of the additional monomers include aromatic monomers such as styrene, vinyl acetate, and N-isopropylacrylamide which can impart temperature responsiveness. These may be used alone or in combinations of two or more.

Specific examples of the homopolymers and copolymers include: homopolymers formed from single hydrophilic monomers, such as polyacrylic acids, polyacrylic acid esters, polymethacrylic acids, polymethacrylic acid esters, polyacryloylmorpholines, polymethacryloylmorpholines, polyacrylamides, polymethacrylamides, polyalkoxyalkyl acrylates, and polyalkoxyalkyl methacrylates; copolymers formed from two or more hydrophilic monomers as listed above; and copolymers formed from one or more hydrophilic monomers as listed above and one or more additional monomers as listed above. These hydrophilic polymers may be used alone or in combinations of two or more.

Specific examples of the homopolymers and copolymers of hydrophilic monomers include polyacrylic acids, polyacrylic acid esters, polymethacrylic acids, polymethacrylic acid esters, polyacryloylmorpholines, polymethacryloylmorpholines, polyacrylamides, polymethacrylamides, polyalkoxyalkyl acrylates, and polyalkoxyalkyl methacrylates.

Preferred among the hydrophilic polymers are polymers represented by the following formula (I). These may be used alone or in combinations of two or more.

(I)

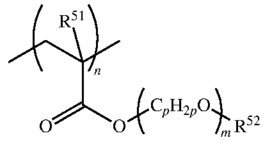

In the formula, $R^{51}$ represents a hydrogen atom or a methyl group; $R^{52}$ represents an alkyl group; p represents 1 to 8; m represents 1 to 5; and n represents the number of repetitions.

Suitable examples of the polymers of formula (I) include polymers represented by the following formula (I-1). These may be used alone or in combinations of two or more.

(I-1)

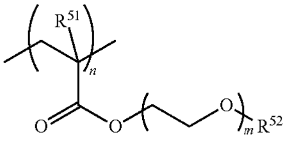

In the formula, $R^{51}$ represents a hydrogen atom or a methyl group; $R^{52}$ represents an alkyl group; m represents 1 to 5; and n represents the number of repetitions.

The number of carbon atoms of the alkyl group for $R^{52}$ is preferably 1 to 10, more preferably 1 to 5. In particular, $R^{52}$ is particularly preferably a methyl group or an ethyl group. The symbol p is preferably 1 to 5, more preferably 1 to 3. The symbol m is preferably 1 to 3. The symbol n (the number of repeating units) is preferably 15 to 1500, more preferably 40 to 1200.

Other suitable examples of the hydrophilic polymers include copolymers of compounds represented by the following formula (II) and additional monomers. These may be used alone or in combinations of two or more.

(II)

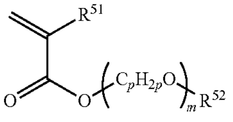

In the formula, $R^{51}$, $R^{52}$, p, and m are as defined above.

Suitable examples of the compounds of formula (II) include compounds represented by the following formula (II-1). These may be used alone or in combinations of two or more.

(II-1)

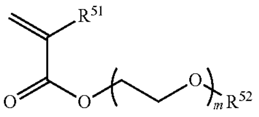

In the formula, $R^{51}$, $R^{52}$, and m are as defined above.

To better achieve the advantageous effect, the hydrophilic polymers of formula (I) are preferred among the above-mentioned hydrophilic polymers, with the hydrophilic polymers of formula (I-1) being particularly preferred.

To better achieve the advantageous effect, the number average molecular weight (Mn) of the polymer used is preferably 8,000 to 150,000, more preferably 10000 to 60,000, still more preferably 10,000 to 39,000. A similar number average molecular weight (Mn) is also desirable when the polymer is a hydrophilic polymer.

Herein, the number average molecular weight (Mn) and the weight average molecular weight (Mw) can be determined by gel permeation chromatography (GPC) (GPC-8000 series available from Tosoh Corporation, detector: differential refractometer, column: TSKgel SuperMultipore HZ-M available from Tosoh Corporation) relative to polystyrene standards.

The thickness of the polymer layer (the layer formed of the polymer) is preferably 10 to 1000 nm, more preferably 30 to 700 nm, still more preferably 50 to 350 nm. When the thickness is adjusted within the range indicated above, selective capture of cancer cells and low adsorption of other proteins and cells are expected to be well achieved.

Here, a similar thickness (film thickness) is also desirable when the polymer layer is a hydrophilic polymer layer (a layer formed of a hydrophilic polymer).

The thickness of the polymer layer can be measured by a transmission electron microscope (TEM).

The surface of the polymer layer (the surface of the polymer layer included in the polymer-coated glass substrate) preferably at least partially (partially or entirely) has a water contact angle of not larger than 60 degrees, more preferably not larger than 50 degrees. The water contact angle is also preferably at least 25 degrees, more preferably at least 33 degrees.

A polymer-coated glass substrate in which a polymer layer is formed entirely or partially on the surface of a glass substrate can be prepared by a known technique, such as 1) by dissolving or dispersing a polymer in any solvent to prepare a polymer solution or dispersion, injecting the polymer solution or dispersion onto the surface of the glass substrate (e.g., the recess of the substrate), and retaining and drying the substrate for a predetermined time, or 2) by applying (spraying) the polymer solution or dispersion to the surface of the glass substrate and optionally drying the substrate. Then, the polymer-coated glass substrate may be combined with other components as needed to produce a device capable of capturing, culturing, analyzing, etc., specific cells.

Conventionally known materials or methods are applicable as the solvent, injection method, application (spraying) method, etc.

The duration of retention or drying in the technique 1) or 2) may be appropriately selected depending on the size of the substrate, the type of liquid introduced, etc. The duration of retention is preferably 10 seconds to 10 hours, more preferably 1 minute to 5 hours, still more preferably 5 minutes to 2 hours. The drying is preferably performed at room temperature (about 23° C.) to 80° C., more preferably at room temperature to 60° C. Moreover, the drying may be carried out under reduced pressure. Furthermore, after a certain time of retention, the excess polymer solution or dispersion may be discharged as appropriate before drying.

The solvent may be any solvent that can dissolve a polymer and may be appropriately selected depending on the polymer used. For example, the solvent may be water, an organic solvent, or a mixture thereof. Examples of the organic solvent include alcohols such as methanol, ethanol, n-propanol, i-propanol, and methoxypropanol; ketones such as acetone and methyl ethyl ketone; tetrahydrofuran, acetonitrile, ethyl acetate, and toluene.

The concentration of the polymer solution or dispersion is not limited and may be appropriately selected in view of injection, application, or spraying properties, productivity, etc. The concentration of the polymer in the polymer solution or dispersion (100% by mass) is preferably 0.1 to 10.0% by mass, more preferably 0.2 to 5.0% by mass.

In the polymer-coated glass substrate prepared as described above, the polymer layer has a soft surface with an elastic modulus in water or an aqueous solution of 1.20 MPa or lower. Thus, the polymer-coated glass substrate has a low ability to capture normal cells such as blood cells but a high ability to capture specific cells such as cancer cells, and therefore exhibits an excellent ability to selectively capture specific cells.

EXAMPLES

The present disclosure will be specifically described below with reference to examples, but the present disclosure is not limited to the examples.

Example 1

(Preparation of Polymer)

Using a solution of azobisisobutyronitrile (AIBN) in toluene (12.5 mg/mL), 2-methoxyethyl acrylate (2.5 wt % in toluene) was thermally polymerized at 60° C. for seven hours to prepare poly(2-methoxyethyl acrylate) (PMEA).

A 2-well chamber slide (soda-lime glass, average thickness 1300 μm) was injected with 145 μL of a 0.155% solution of PMEA in methanol. Immediately thereafter, the chamber slide was subjected to vacuum drying (coating) in an oven at 40° C. for five minutes to prepare a polymer-coated glass substrate.

Example 2

(Preparation of Polymer)

Using a solution of azobisisobutyronitrile (AIBN) in methanol (12.5 mg/mL), 2-methoxyethyl acrylate (2.5 wt % in methanol) was thermally polymerized at 60° C. for seven hours to prepare poly(2-methoxyethyl acrylate) (PMEA).

A 2-well chamber slide (soda-lime glass, average thickness 1300 μm) was injected with 145 μL of a 0.155% solution of PMEA in methanol. Immediately thereafter, the chamber slide was subjected to vacuum drying (coating) in an oven at 40° C. for five minutes to prepare a polymer-coated glass substrate.

Comparative Example 1

(Preparation of Polymer)

Using a solution of azobisisobutyronitrile (AIBN) in methanol (12.5 mg/mL), 2-methoxyethyl acrylate (5.0 wt % in methanol) was thermally polymerized at 60° C. for seven hours to prepare poly(2-methoxyethyl acrylate) (PMEA).

A 2-well chamber slide (soda-lime glass, average thickness 1300 μm) was injected with 145 μL of a 0.155% solution of PMEA in methanol. Immediately thereafter, the chamber slide was subjected to vacuum drying (coating) in an oven at 40° C. for five minutes to prepare a polymer-coated glass substrate.

For the polymer-coated glass substrates prepared in the examples and comparative example, the thickness of the polymer layer and the AFM elastic modulus in an aqueous phosphate buffered solution (PBS) were measured as described below. Table 1 shows the results.

[Thickness of Polymer Layer]

The thickness (film thickness) of the polymer layer formed on each polymer-coated glass substrate was measured by TEM at an acceleration voltage of 200 kV (JEOL Ltd., JEM-2800).

The film thicknesses in Examples 1 and 2 and Comparative Example 1 were 78 nm, 88 nm, and 90 nm, respectively.

[Measurement of AFM Elastic Modulus in Aqueous Phosphate Buffered Solution (PBS)]

Phosphate buffered saline was dropped on the surface of the polymer layer of each polymer-coated glass substrate to form a droplet (convex meniscus). The elastic modulus was measured by the following method using the device (AFM) described below. The determined elastic modulus is defined as the elastic modulus measured in water or an aqueous solution.

Here, in the measurement of the elastic modulus, the obtained force curve was analyzed based on the JKR contact theory to determine the elastic modulus.

<Method for Measuring Elastic Modulus>

Device (AFM): MFP-3D-SA available from Oxford Instruments

Measurement mode: AFM force curve mapping

Cantilever: material Si, radius of curvature of tip R=150 nm, spring constant 0.67 N/m Measurement range: scan of 20 μm×20 μm, calculation of elastic modulus by 2-point JKR method Scanning rate: 1 Hz Measurement environment: in PBS Measurement temperature: 23° C.

TABLE 1

| | Example 1 | Example 2 | Comparative Example 1 |
|---|---|---|---|
| Mn of hydrophilic polymer of polymer layer | 19350 | 47285 | 101965 |
| Mw of hydrophilic polymer of polymer layer | 61741 | 178732 | 400249 |
| AFM elastic modulus (MPa) in PBS | 0.14 | 0.41 | 2.02 |

Comparative Example 1 has an elastic modulus of 2 MPa or higher and is therefore considered to exhibit reduced adhesion of specific cells such as cancer cells. It is also considered to exhibit high stickiness to white blood cells.

In contrast, Example 2 has an elastic modulus of 0.50 MPa or lower and is therefore considered to exhibit improved adhesion of specific cells such as cancer cells. It is also considered to exhibit reduced stickiness to white blood cells.

Example 1 has an elastic modulus of 0.30 MPa or lower and is therefore considered to exhibit improved adhesion of specific cells such as cancer cells compared to Example 2. It is also considered to exhibit reduced stickiness to white blood cells compared to Example 2.

Exemplary embodiments of the present disclosure include:

Embodiment 1. A polymer-coated glass substrate, including:

a glass substrate; and a polymer layer formed on a surface of the glass substrate, a surface of the polymer layer having an elastic modulus in water or an aqueous solution of 1.20 MPa or lower.

Embodiment 2. The polymer-coated glass substrate according to Embodiment 1, wherein the elastic modulus is 0.50 MPa or lower.

Embodiment 3. The polymer-coated glass substrate according to Embodiment 1, wherein the elastic modulus is 0.30 MPa or lower.

Embodiment 4. The polymer-coated glass substrate according to any combination with any one of Embodiments 1 to 3, wherein the elastic modulus is 0.05 MPa or higher.

Embodiment 5. The polymer-coated glass substrate according to any combination with any one of Embodiments 1 to 4, wherein the polymer layer is formed of a polymer represented by the following formula (I):

(I)

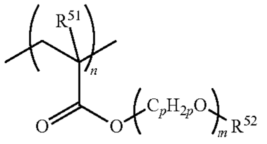

wherein $R^{51}$ represents a hydrogen atom or a methyl group; $R^{52}$ represents an alkyl group; p represents 1 to 8; m represents 1 to 5; and n represents the number of repetitions.

Embodiment 6. The polymer-coated glass substrate according to any combination with any one of Embodiments 1 to 4, wherein the polymer layer is formed of a polymer represented by the following formula (I-1):

(I-1)

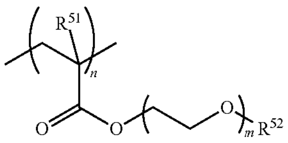

wherein $R^{51}$ represents a hydrogen atom or a methyl group; $R^{52}$ represents an alkyl group; m represents 1 to 5; and n represents the number of repetitions.

Embodiment 7. The polymer-coated glass substrate according to any combination with any one of Embodiments 1 to 4, wherein the polymer layer is formed of a copolymer of a compound represented by the following formula (II) and an additional monomer:

(II)

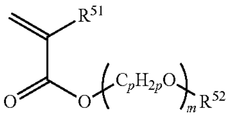

wherein $R^{51}$ represents a hydrogen atom or a methyl group; $R^{52}$ represents an alkyl group; p represents 1 to 8; and m represents 1 to 5.

Embodiment 8. The polymer-coated glass substrate according to any combination with any one of Embodiments 1 to 4, wherein the polymer layer is formed of a copolymer of a compound represented by the following formula (II-1) and an additional monomer:

(II-1)

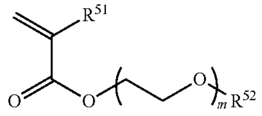

wherein $R^{51}$ represents a hydrogen atom or a methyl group; $R^{52}$ represents an alkyl group; and m represents 1 to 5.

Embodiment 9. The polymer-coated glass substrate according to any combination with any one of Embodiments 5 to 8, wherein the polymer forming the polymer layer has a number average molecular weight (Mn) of 10,000 to 39,000.

Embodiment 10. The polymer-coated glass substrate according to any combination with any one of Embodiments 1 to 9, wherein the polymer layer has a thickness of 10 to 1000 nm.

Embodiment 11. The polymer-coated glass substrate according to any combination with any one of Embodiments 1 to 10, wherein the elastic modulus is measured with an atomic force microscope.

The invention claimed is:

1. A polymer-coated glass substrate, comprising:

a glass substrate; and a polymer layer formed on a surface of the glass substrate, wherein a surface of the polymer layer has an elastic modulus in water or an aqueous solution of 0.30 MPa or lower, a polymer forming the polymer layer has a number average molecular weight (Mn) of 10,000 to 39,000, and the polymer layer is formed of poly(2-methoxyethyl acrylate).

2. The polymer-coated glass substrate according to claim 1, wherein the elastic modulus is 0.05 MPa or higher and 0.30 MPa or lower.

3. The polymer-coated glass substrate according to claim 1, the polymer layer has a thickness of 10 to 1000 nm.

4. The polymer-coated glass substrate according to claim 1, wherein the elastic modulus is measured with an atomic force microscope.

5. The polymer-coated glass substrate according to claim 1, wherein the elastic modulus is 0.05 MPa or higher and 0.14 MPa or lower, and the polymer layer has a thickness of 10 nm to 78 nm.

6. The polymer-coated glass substrate according to claim 1, wherein the elastic modulus is 0.14 MPa or higher and 0.30 MPa or lower, and the polymer layer has a thickness of 10 nm to 78 nm.

7. The polymer-coated glass substrate according to claim 1, wherein the polymer is formed using a solution of azobisisobutyronitrile in toluene.

* * * * *